Nov. 11, 1958   F. G. BOUCHER   2,859,938
ORIENTATION OF SUBSURFACE EARTH CORES
Filed Jan. 3, 1955   3 Sheets-Sheet 1

Frank G. Boucher   Inventor

By   W. N. Wright   Attorney

Nov. 11, 1958  F. G. BOUCHER  2,859,938
ORIENTATION OF SUBSURFACE EARTH CORES
Filed Jan. 3, 1955  3 Sheets-Sheet 2

Frank G. Boucher  Inventor

By *W. N. Wright*  Attorney

Nov. 11, 1958  F. G. BOUCHER  2,859,938
ORIENTATION OF SUBSURFACE EARTH CORES
Filed Jan. 3, 1955  3 Sheets-Sheet 3
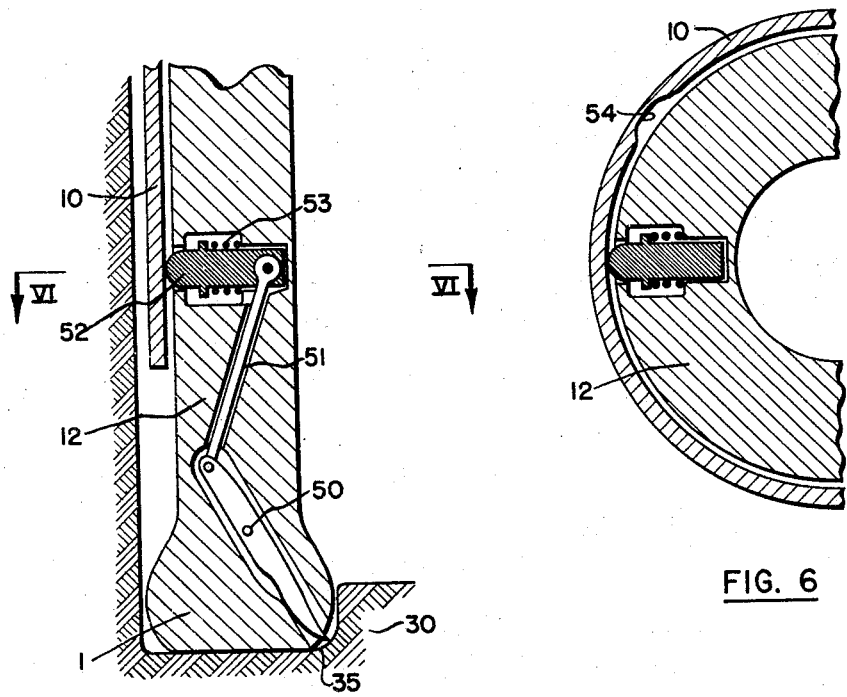
FIG. 5
FIG. 6
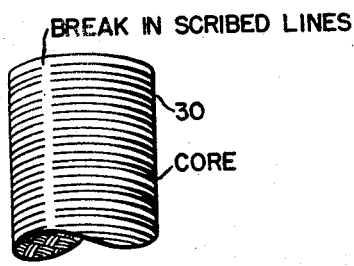
FIG. 4
Frank G. Boucher  Inventor
By *W. N. Wright*  Attorney United States Patent Office 2,859,938
Patented Nov. 11, 1958

2,859,938

ORIENTATION OF SUBSURFACE EARTH CORES

Frank G. Boucher, Tulsa, Okla., assignor, by mesne assignments, to Jersey Production Research Company Application January 3, 1955, Serial No. 479,637

6 Claims. (Cl. 255—1.4)

The present invention is concerned with the orientation of core samples as the samples are formed beneath the surface of the earth. The invention is particularly concerned with a method and apparatus for orienting core samples that are taken from earth substrata which are encountered in drilling bore holes through the earth. The invention especially relates to a method and apparatus for orienting the core samples which are taken from the bottom of bore holes that are drilled in connection with the production of petroleum.

Core orientation involves removing from a bore hole a sample cut by an oil well coring bit and orienting it in space in the same position that it occupied in the formation from which it was taken. Normally such orientation of core samples is done for the purpose of aiding in the proper evaluation of subsurface geology and thus determining the proper drilling program for the well. A further purpose is to facilitate the proper development of an oil field by ascertaining the dip and strike of subsurface formations, such data being of considerable importance to the geologist. This information can be obtained from any oriented core that contains bedding planes.

Although data for determining dip and strike can be obtained by other methods, as for example by electric logging and bore hole profile logging techniques, such methods rely on the difference in properties between the successive strata and are not applicable where massive bodies of limestone or sandstone are encountered. Hence the need for orienting cores to obtain the fullest information when boring a well.

In some instances it is possible to orient a core by its inherent natural magnetism which may have been established by the orienting effect of the earth's magnetic field acting upon the magnetizable particles present within the formation over long geologic periods of time. However, such methods of orienting cores are not often feasible and when feasible are not always reliable. Thus it is usually necessary to orient the cores by some method of marking during or prior to the taking of the cores. Previous methods of orienting cores have involved marking the top of the cores in some manner, as for example, by stamping an oriented arrow on the top of the subsurface layer that is to be cored or by attaching a layer of cement or other hardenable material containing magnetic particles to the top of the subsurface layer to be cored. Another method is to drill a pilot hole into the subsurface layer and to fill the hole with a hardenable material containing magnetic particles. Each of these methods has not been entirely satisfactory however because of the tendency for the oriented portion and also other portions of the core to break off and to be displaced from the original positions that they had relative to one another.

It is an object of the present invention to provide a method and apparatus whereby a core sample is oriented substantially in situ and the orientation information is retained permanently regardless of any breaking of the core in handling.

It is a further object of the invention to provide a method and apparatus whereby an inscription or identifying mark is placed on the side wall surface of a core sample immediately as it is cut and for orienting this mark with respect to true north.

The above objectives are realized in accordance with an apparatus embodiment of the present invention by utilizing a rotary type coring apparatus which has associated with it a scribing device. The scribing device is adapted to form a pattern on the side wall surface of a core sample, the pattern being characterized by a unique break in the pattern at an identical angular point during each rotation of the apparatus. The apparatus further includes a member which is anchored to the side wall of the bore hole so as to be rotationally stationary during the coring operation and which includes means for actuating the scribe at the aforementioned angular point. Finally, means are provided for orienting the anchorable member with respect to magnetic north insofar as its position during a coring operation is concerned and thereby also orienting the core.

Apparatus embodiments of the invention as well as process embodiments of the invention may be best understood by reference to the attached figures which schematically depict apparatus contemplated to illustrate the best mode of carrying out the invention.

Figure 4 is a perspective view of a fragment of the core sample produced by the apparatus of Figures 1–3 inclusive.

Figure 5 is a fragmentary view in vertical cross section of another embodiment of the present core scribing means.

Figure 6 is a fragmentary view taken along the lines VI—VI of Figure 5.

Figures 1, 7:
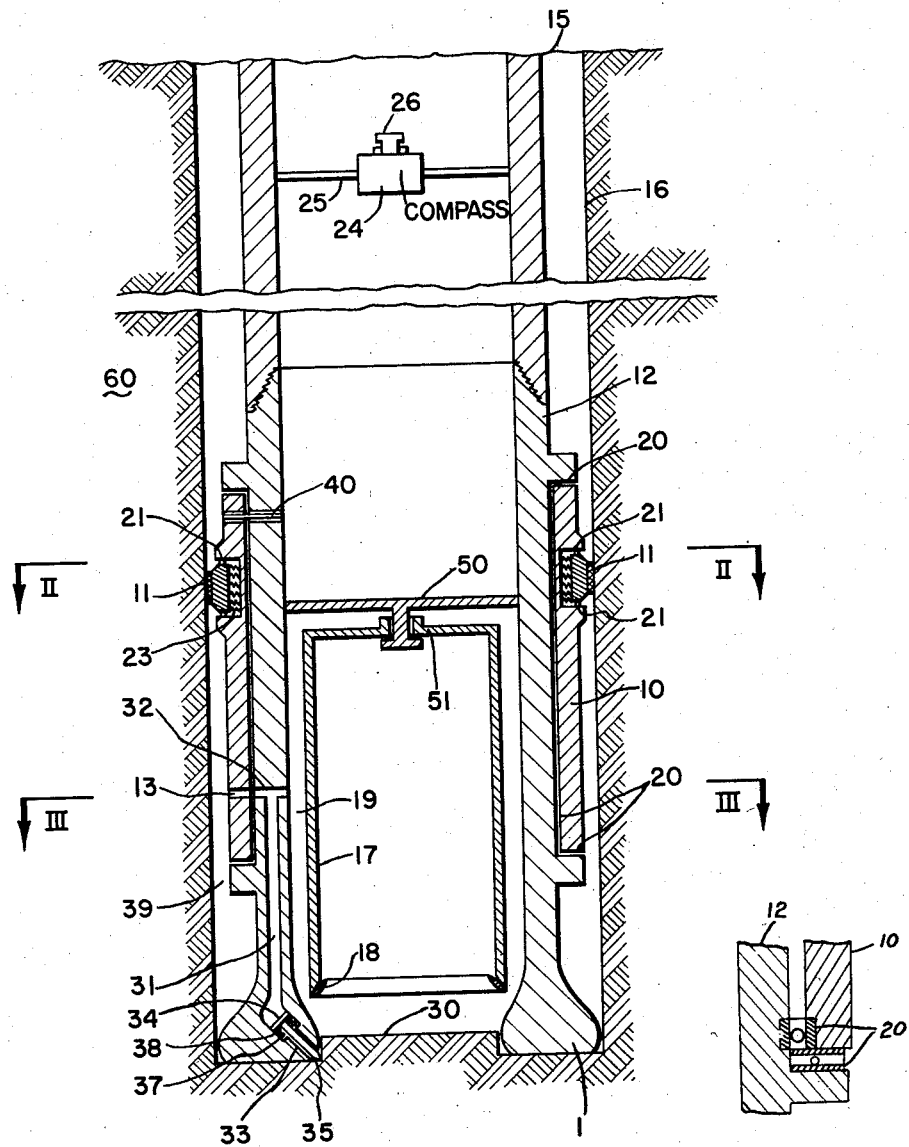
Figure 1 illustrates in vertical cross section a substantially conventional drill string and coring bit which have been modified to incorporate the principles of the invention.
Fig. 7 shows in detail a type of bearing arrangement which may be used between sleeve 10 and sub 12.

Referring first to Figure 1 it will be seen that the apparatus illustrated therein includes a drill pipe 15, a sleeve 10, anchoring feet 11, coring bit 1, and sub 12. The drill pipe 15 extends upwardly through the bore hole 16 to the earth's surface where it may be driven by any conventional rotary apparatus, not shown. At its lower end drill pipe 15 may extend directly to the coring bit 1, but it is preferably connected indirectly to the bit as by means of sub 12. Suitable threaded, bolted or welded connections may be utilized for connecting the various pieces. As shown in Fig. 1, the sub 12 and the bit 1 is one integral assembly, and the assembly is connected to the drill pipe 15 by means of a threaded connection.

Coring bit 1 may be any conventional form of coring bit, but it is preferably a diamond-type bit. Positioned directly above the coring bit is a core barrel 17 which may be provided with a conventional core catcher 18. Annular passageway 19 is provided between sub 12 and core barrel 17 so that drilling fluid, which flows downwardly through the drill pipe 15 during the coring operation, may reach the coring bit 1 and the bottom of the bore hole. Once having reached the vicinity of the coring bit, the drilling fluid flows upwardly in the annular space 39 between the overall coring apparatus and the wall of the bore hole and returns to the earth's surface. In this way the bit may be cooled and cuttings may be removed. The core barrel is supported in a conventional manner as by means of rod members 50 and swivel connection 51.

Sleeve member 10 surrounds the sub 12 and is preferably supported from the rotating part of the drilling apparatus. Sleeve 10, however, is also preferably arranged to provide free rotational movement between it and the rotating parts such as the drill pipe 15, sub 12 and bit 1. This condition may be met as by means of one or more bearing members 20 which are positioned intermediate the sleeve member and the rotating parts. These bearing members may be sleeve-type bearings, but they are preferably ball-type bearings or roller-type bearings. The bearings are arranged to support the sleeve 10 and also to provide freedom of movement for the rotating parts relative to the stationary member. A type of bearing arrangement that may be used between the lower end of sleeve 10 and sub 12 is shown in fragmentary detail in Fig. 7. A similar arrangement may be used at the top of the sleeve.

Figure 2:
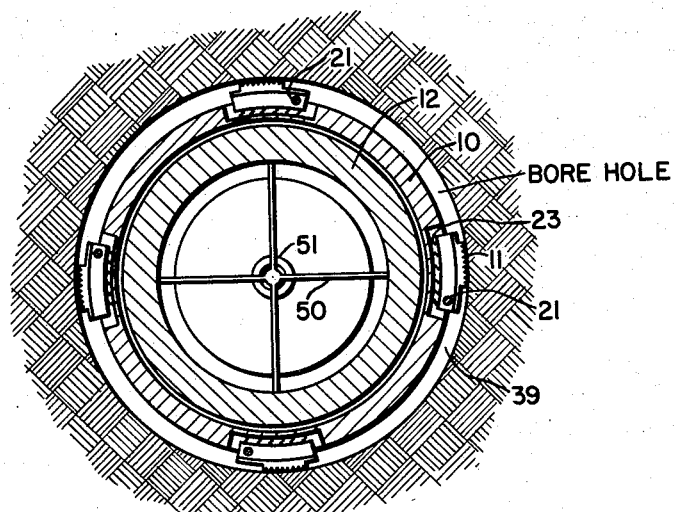
Figure 2 is a sectional view taken along the lines II—II in Figure 1.

Sleeve 10 is also provided with means for locking this member in a fixed position within the bore hole 16 during operation of the coring apparatus. Any number of different devices may be utilized for this purpose. Illustrated in Figure 1 and 2 are a plurality of dogs 11 which are circumferentially spaced around the member 10 and which are mounted directly on this member by means of pivots 21. The upper and lower surfaces of the dogs are preferably beveled to provide relatively free movement of the apparatus in a vertical direction. Rotational movement of the dogs with attendant rotary motion of the sleeve 10 is prevented by teeth, cleats or the like mounted on the laterally outer surface of each dog. In order to further ensure non-rotational movement of the sleeve 10, the dogs 11 are forced outwardly and against the inner surface of the bore hole in response to urging means such as spring members 23. Thus, sleeve member 10 is maintained in a fixed position throughout the coring operation relative to the surrounding formation and also to a scribing device to be described in detail hereinafter. A shear pin 40 may also be included in the apparatus to help maintain sleeve 10 and sub 12 in a fixed relationship while the apparatus is lowered into a coring position. The pin 40, of course, must be adapted to shear readily when rotation of the bit is commenced. Specifically, pin 40 must shear before slippage of the dogs 11 can occur.

Means are also provided in the apparatus for determining the orientation of the sleeve member 10 with respect to magnetic north. A number of conventional devices may be employed for this purpose, and a schematic arrangement of such a device is depicted in the figure. The device in this instance is a magnetic compass member 24 which is supported by means of rods 25 from the inner side wall surface of a non-magnetic portion of the drill string, for example in a brass section. The compass is preferably liquid-damped and is locked in position at any desired time by dropping a go-devil, weight, or equivalent device upon the plunger element 26. Arrangements of this type are conventional in the art and a detailed discussion of this feature will accordingly not be presented in this description. Reference is made to Ser. No. 284,787 filed April 28, 1952 (since matured into U. S. 2,709,069) in the name of F. G. Boucher and entitled "Orienting Subsurface Earth Cores In Situ" for an example of a suitable compass locking device. It is important to note, however, that the angular relationship between a passageway 13 (to be described later) and the lubber's line on the compass 24 be determined when the entire apparatus has been assembled and then lowered in a bore hole. As will be more apparent later hereinafter, knowledge of this relationship automatically affords knowledge concerning the orientation of the core that is cut by the apparatus.

Having described the apparatus features necessary for locking the sleeve member 10 in position at the bottom of a bore hole and for orienting this member as well as sub 12 and bit 1 with respect to true north, attention is now directed toward the primary feature of the present invention—namely the scribing device for establishing the orientation of the core sample 30. With this in mind it will be observed that sub 12 is provided in its lower wall portion with a vertically disposed conduit 31 and a horizontally disposed conduit 32. The latter conduit extends from the drilling fluid passageway 19 between the core barrel 17 and sub 12 to the very limited and essentially fluid-tight annular space between the sub 12 and sleeve 10. Conduit 31 on the other hand extends from an intermediate point of conduit 32 vertically downward and terminates within the upper portion of an inclined cylinder 33. Thus, drilling fluid in the bore hole exerts a pressure from within the annular passageway 19 to conduit 32 and also to cylinder 33 via conduit 31.

Disposed within cylinder 33 is piston element 34 to the lower surface of which is attached a very hard point 35 capable of making a mark on materials such as shale, limestone, and other subterranean strata.

As illustrated in Figure 1 piston member 34 and cylinder 33 are provided with shoulders to form a somewhat enlarged annular chamber 37 between them adapted to house a spring element 38 which is designed and adapted to withdraw the point 35 of the piston element 34 up and within the cylinder 33. Upon the exertion of a head of drilling fluid through conduit 31, however, spring element 38 is compressed and point 35 forced outwardly from its position within cylinder 33.

Figure 3:
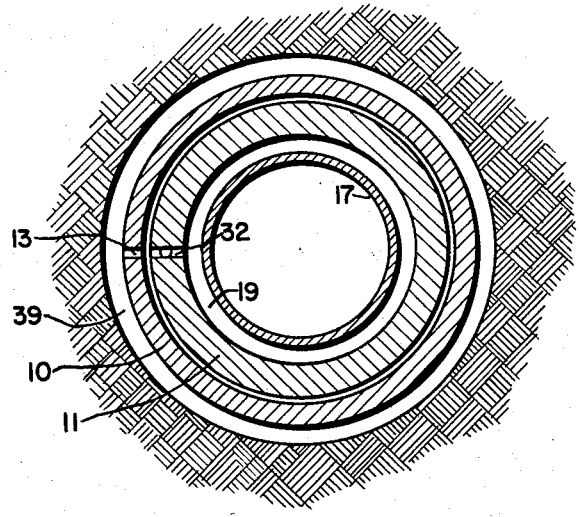
Figure 3 is a sectional view taken along the lines III—III of Figure 1.

Referring now to Figure 3 as well as Figure 1 it will be seen that sleeve member 10 is provided with a small liquid passageway 13 which at one point in every revolution of the sub member 12 becomes aligned with conduit 32, thereby providing direct flow of drilling fluid from annular passageway 19 to the annular passageway 39 between the overall apparatus and the wall of the bore hole. Bypassing of the drilling fluid in this manner releases pressure otherwise impressed upon the upper surface of piston 34 with the result that spring member 38 forces the piston upward and draws point 35 up and within cylinder 33. It is a well known fact that very substantial pressure drops occur in a stream of drilling fluid in the region of a coring bit; and it is these pressure drops that are utilized in part by the apparatus of Figures 1–3.

Having described the primary apparatus features of the apparatus in Figures 1–3 inclusive, attention is now directed toward the best mode contemplated for operating the apparatus. At the outset of this description it will be assumed that a bore hole 16 has been drilled through formation 60 and that it is now desired to take a core sample from the bottom of the hole. At this point the conventional drilling apparatus is removed from the hole and sub 12 with its associated bit 1 and sleeve member 10 are secured to the lower end of the drill pipe 15. Before lowering this apparatus into the bore hole 16, it is necessary as pointed out before to note the original alignment of sleeve member 10 with respect to an index mark such as the lubber's line on compass 24 and also point 35. With point 35 vertically below conduit 32, it is necessary only to note the relative positions of the lubber's line and a particular part of sleeve 10, preferably conduit 13. For the purpose of this description it will be assumed that sleeve 10 and sub 12 are originally aligned by aligning passageway 13 with conduit 32. It will further be assumed that sleeve 10 and sub 12 are prevented from any relative rotational movement by a shear pin 40 extending through both members.

Having aligned sleeve 10, sub 12, compass 24 and scribing device 35, the apparatus is now lowered to the bottom of the bore hole 16. At this point dogs 11 are urged outward against the surface of the bore hole by the springs 23. Sleeve 10 accordingly is rotationally stationary, and the next step in the procedure consists in determining the orientation of this sleeve and also the scribing device 35 at the bottom of the bore hole. This is done by dropping a go-devil or lowering a sufficiently heavy weight against locking member 26 which is thereby driven into and locks magnetic compass 24. Thus, the direction of the magnetic north pole at the bottom of the bore hole relative to the positions of passageway 13 and the lubber's line of the compass at the start of the coring operation proper is established. For example, if we assume that the needle of the magnetic compass in Figure 1 is pointing directly to the left at the instant shear pin 40 breaks and coring starts, then the conduit 32, passageway 13 and scribing device 35 are also pointing directly to the north with reference to the center of the overall apparatus whenever the device 35 breaks contact with the core 30. It is apparent that the relative positions of all of these parts may be readily reconstructed when the entire apparatus is removed from the bore hole.

Having locked the compass, the coring operation is commenced by rotating drill string 15 and coring bit 1 and thereby shearing pin 40. To assist in the coring operation a conventional drilling mud is simultaneously circulated downward within the drill string 15 and upward in the annular space 39 between the apparatus and the wall of the bore hole. During this drilling operation, there is only one point in every revolution of the drilling bit when the drilling mud within the annular channel 19 is capable of bypassing the bit by flowing directly through conduit 32 and passageway 13 into annular space 39. At all other times the drilling mud must flow downward within the apparatus and around the coring bit in order to reach the annular space 39. Accordingly, the vertical wall surface of the cylindrical core sample 30 is covered with a continuous scribe mark except for a unique interval in every revolution of the bit when passageway 13 is aligned with conduit 32. At this unique point in every revolution, the scribing device 35 is lifted from its point of contact with the core sample, and the scribe mark is broken. The effect of this procedure is best illustrated in Figure 4 where it may be seen that core 30 is substantially completely covered with a continuous scribe mark with the exception of a very narrow vertical trace where the scribing device was out of contact with the core.

It will be apparent that the break in the scribe mark in the example under consideration is placed on the core in a position directly north from the center of the core. That this is the case is readily apparent when one considers that in the example the scribe device 35, the passageway 13 and the needle of the compass 24 all pointed north at the moment that coring was initiated. It will be equally apparent that the apparatus makes possible the orientation of any core sample that is taken with this apparatus provided the aforementioned precautions in assembling and lowering the apparatus are observed.

When a sufficient core sample has been cut and the sample is held up within core barrel 17 by its contact with the core catcher 18, the sample may be recovered lifting the entire apparatus back up to the surface of the earth. Once the apparatus has been recovered, it is simply necessary to note what point of the overall apparatus was directly north from the center of the apparatus (as indicated by the magnetic compass 24) and with this information to determine the compass direction of the unique portion of the scribing mark on the core sample 30. In as much as the entire core sample is marked immediately as it is cut from the formation underlying a bore hole, any fragments or broken portions of the core may be readily reassembled exactly as they existed in the formation.

At this point it should be noted that the present invention is not to be limited in its scope to the particular embodiment that is discussed above. Rather, it will be appreciated that a great number of modifications may be incorporated within the apparatus and process described there without departing from the spirit or scope of the invention. For example, it may be desirable in some instances to employ a scribing device of a type such as is illustrated in Figures 5 and 6. In these figures the scribing device is a mechanically actuated one which is arranged to inscribe a mark on the wall of a core sample at one brief interval in every rotation of the coring bit. During the remaining portion of each rotation, the scribing device is out of contact with the core.

The apparatus in these figures once again includes a coring bit 1, sub member 12, sleeve member 10 and scribing device 35. The scribing device in this instance is pivotally mounted at an intermediate point on pivot member 50 which in turn is secured to the body of sub 12. In other words scribing device 35 is free to pivot in a vertical plane around the pivot point 50. As illustrated in Figure 5, the point of device 35 is at its lowest vertical point and is out of contact with the wall of the core sample 30. The point of device 35 has been forced into this position by the upward thrust of connecting rod 51 which has been driven laterally inward of sub member 12 by the cam follower 52. In other words the laterally outer end of cam follower 52 has been moved inward of sub 12 by riding against the inner surface of sleeve 10. Cam follower 52 is urged against sleeve 10 by the thrust of spring member 53.

As the recessed portion or cam 54 of sleeve 10 is aligned with cam follower 52—i. e. when the cam follower 52 is rotated past this point—the cam follower moves laterally outward into the recessed portion and consequently thrusts and moves rod 51 in a downward direction. The downward movement of this rod in turn depresses the laterally outer portion of scribe 35 and raises the hard tip portion of the scribe. By raising the tip, this portion of the scribing device is momentarily thrust against the wall of core sample 30 and inscribes a small mark thereon. This mark or inscription is repeated in a substantially vertical direction along the entire length or height of the core. Through the procedure and other apparatus details presented earlier in this description relative to the apparatus of Figures 1–4, it will be recognized that the scribe marks of the apparatus in Figures 5 and 6 may also be readily utilized to orient the core.

Once again it will be realized that considerable modification may be incorporated within the apparatus of Figures 5 and 6 without departing from the scope or spirit of the invention. Thus, it may be desirable to provide a roller bearing or other frictionless-type bearing in the laterally outer portion of the cam 52 to reduce the friction between this portion of the cam and the sleeve 10. Furthermore, a large number of different mechanical linkages and actuating means may be employed to cause the scribe point 35 to make contact or lose contact with the core sample. It will also be appreciated that the scribing device may be adapted to place an indelible mark rather than an inscription on the wall of the core sample.

It will also be appreciated that sleeve 10 may be locked in position in the bottom of a bore hole in a number of different ways other than the way discussed hereinbefore.

Again, the apparatus and method of the present invention may be employed in sampling a wide variety of subterranean strata and in combination with liquid drilling fluids as well as gaseous drilling fluids.

What is claimed is:

1. In a rotary-type coring apparatus including a rotatable drill string, a coring bit attached to the lower end of the drill string, and a stationary core-receiving barrel disposed within the lower end of the drill string to receive a core after it is formed by the bit, means for orienting the core which comprises retractable scribing means mounted adjacent the bit and adapted when extended to inscribe a mark on the sidewall surface of the core as the core is cut, said scribing means contacting the core when in an extended position, a member supported exterior of said drill string and supported by the drill string in a rotatable relation therewith, gripping means attached to said member and adapted to engage the sidewall of a borehole so as to maintain said member in a fixed position rotationally relative to the drill string and the bit, actuating means associated with said drill string and cooperable with said member to extend and retract the scribing means during a predetermined portion of each revolution of the drill bit and drill string, a compass including a lubber's line supported within and by the drill string above the core-receiving barrel, means to maintain said member in a predetermined azimuthal relation with respect to the lubber's line of the compass and said actuating means prior to the rotation of the drill bit, and means to lock the compass prior to rotation of the drill bit.

2. In a rotary-type coring apparatus including a string of drill pipe rotatable within a borehole, a coring bit attached to the lower end of the drill pipe, and a stationary-type core-receiving barrel and core catcher mounted within and supported by the drill string immediately above the bit, means for determining the orientation of a core which is cut by the bit which comprises a sleeve supported by and around the drill string in a rotationally movable relation therewith, gripping means on the exterior surface of the sleeve adapted to engage the wall of a borehole and thereby maintain the sleeve rotationally stationary relative to the bit, scribing means supported from the drill string and bit assembly in the immediate vicinity of the bit operable to scribe a mark on the core immediately as the core is cut, actuating means supported by said drill string and cooperable with said sleeve to operate said scribing means during a predetermined arcual portion of each complete rotation of the drill bit, a compass including a lubber's line fixedly mounted within the drill string above the core-receiving barrel, alignment means for maintaining the pipe string and the sleeve in a predetermined azimuthal relation with respect to the lubber's line prior to rotation of the drill string, and means to lock the needle of the compass.

3. An apparatus as defined in claim 2 in which the alignment means is a shear pin interconnecting the pipe string and the sleeve.

4. In a rotary-type coring apparatus including a rotatable portion comprising a drill string and a coring bit, and a stationary portion comprising a core-receiving barrel mounted within the drill string above the bit, the improvement which comprises scribing means attached to the rotatable portion of the apparatus and operable to inscribe a mark on the sidewall surface of a core as the core is formed by the bit, a member supported by an exterior of the drill string in a rotationally movable relation therewith, said member being anchorable to the wall of the borehole so as to resist rotational movement therebetween, actuating means having cooperating parts on said member and said rotatable portion to operate the scribing means during the same angular portion of each complete rotation of the coring bit, means for maintaining the reference member and the coring bit in a predetermined azimuthal relation prior to rotation of the bit, a compass fixedly supported by and within the drill string, and means operable from the earth's surface to lock the needle of the compass.

5. In a rotary-type apparatus for taking a core sample from a formation underlying the bottom of a borehole including a rotatable portion comprising a drill string and a coring bit, and a stationary portion comprising a core-receiving barrel mounted within the drill string so as to receive a core cut by the drill bit, the improvement which comprises in combination scribing means supported by the rotatable portion and operable to form a scribe mark on the sidewall surface of the core immediately as it is cut by the bit, a member supported by and exterior of the rotatable portion in a rotationally movable relation therewith, said member being anchorable to the sidewall surface of the borehole to resist rotational movement therebetween, means on said rotatable portion cooperable with said member to operate said scribing means during the same angular portion of each rotation of the rotatable portion, means to maintain said member and the rotatable portion in a fixed azimuthal relation prior to a coring operation, a compass including a lubber's line mounted within the drill string in a fixed azimuthal relation therewith, and means operable to lock the needle of the compass.

6. In an apparatus for taking a core from a formation underlying a borehole and for ascertaining the orientation of the core which includes a drill string, a coring bit attached to the lower end of the drill string and rotatable therewith, and a rotationally stationary core-receiving barrel supported within the drill string immediately above the bit, the improvement which comprises in combination a scribing device supported from the drill string and bit assembly in the immediate vicinity of the drill bit and operable to inscribe a mark on the sidewall of a core as it is cut by the bit, a sleeve member supported by and exterior of the drill string in a freely rotational relation therewith, gripping means on said sleeve member adapted to engage the wall of a borehole and thereby maintain the sleeve member rotationally stationary relative to the drill bit and drill string, cam means on said sleeve member and cam-follower means on said drill string cooperable with one another to operate the scribing device during the same angular portion of each rotation of the drill bit and drill string, a compass including a lubber's line supported by the drill string above the core-receiving barrel, means to maintain the lubber's line of the compass and said cam means in a predetemined azimuthal relation prior to rotation of the drill bit relative to the sleeve member, and means operable from the earth's surface to lock the needle of the compass.

References Cited in the file of this patent

UNITED STATES PATENTS

| | | |
|---|---|---|
| 2,489,566 | Engle | Nov. 29, 1949 |
| 2,657,013 | Brady | Oct. 27, 1953 |